(12) United States Patent
Long et al.

(10) Patent No.: US 11,332,842 B2
(45) Date of Patent: May 17, 2022

(54) ALUMINUM SURFACE TREATMENT METHOD

(71) Applicant: Dongguan DSP Technology Co., Ltd., Dongguan (CN)

(72) Inventors: Guo Tie Long, Shenzhen (CN); Tan Yonggang, Shenzhen (CN)

(73) Assignee: DONGGUAN DSP TECHNOLOGY CO., LTD., Dongguan (CN)

( * ) Notice: Subject to any disclaimer, the term of this patent is extended or adjusted under 35 U.S.C. 154(b) by 0 days.

(21) Appl. No.: 17/091,126

(22) Filed: Nov. 6, 2020

(65) Prior Publication Data

US 2021/0164123 A1  Jun. 3, 2021

(30) Foreign Application Priority Data

Nov. 8, 2019  (JP) .............................. JP2019-203410

(51) Int. Cl.
| | |
|---|---|
| *C25D 11/12* | (2006.01) |
| *C25D 11/08* | (2006.01) |
| *C01F 7/428* | (2022.01) |
| *C25D 11/24* | (2006.01) |

(52) U.S. Cl.
CPC .............. *C25D 11/12* (2013.01); *C01F 7/428* (2013.01); *C25D 11/08* (2013.01); *C25D 11/24* (2013.01)

(58) Field of Classification Search
None
See application file for complete search history.

(56) References Cited

U.S. PATENT DOCUMENTS

| | | | | | |
|---|---|---|---|---|---|
| 3,915,811 | A | * | 10/1975 | Tremmel ............... | C25D 11/06 205/172 |
| 4,152,221 | A | * | 5/1979 | Schaedel ............... | C25D 21/12 205/108 |
| 4,939,068 | A | * | 7/1990 | Lauke ................... | B41N 3/034 205/201 |

FOREIGN PATENT DOCUMENTS

| | | | | |
|---|---|---|---|---|
| JP | 2019166638 A | * | 10/2019 | ............. B29C 66/43 |
| KR | 10-2019-0007940 A | | 1/2019 | |

OTHER PUBLICATIONS

Machine translation of Hosoi et al. (JP-2019166638-A) (Year: 2019).*

* cited by examiner

*Primary Examiner* — Wojciech Haske
(74) *Attorney, Agent, or Firm* — Greer, Burns & Crain, Ltd

(57) ABSTRACT

To provide an aluminum surface treatment method for manufacturing a polymer-aluminum joint structure having excellent bond strength. An aluminum surface treatment method for bonding with a polymer composite which is characterized in that it includes
(a) a primary anodizing treatment step wherein the aluminum surface is treated by anodic oxidation;
(b) a step wherein the aluminum oxide film is removed from the aluminum that has undergone the primary anodizing treatment; and
(c) a secondary anodizing treatment step wherein the aluminum from which the aluminum oxide film is removed following the primary anodizing treatment is treated by anodic oxidation again.

3 Claims, 11 Drawing Sheets

(A) 1st anodization
(B) 2nd anodization
(C) 2nd anodization + Additive

Figure: Fracture interfaces (D)

(A)
1st anodizing
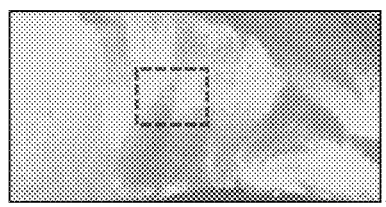
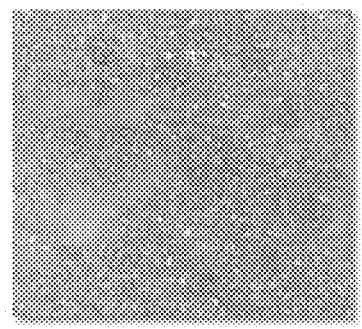
(B)
2nd anodization
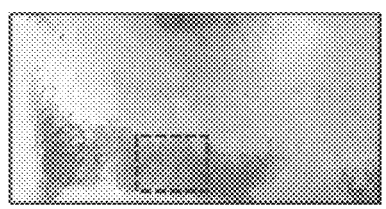
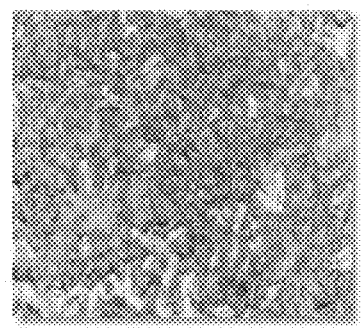
(C)
2nd anodization
+ Additive
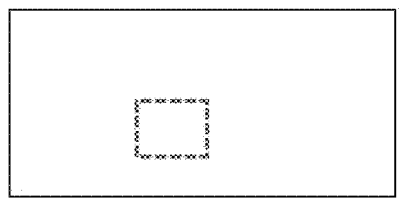
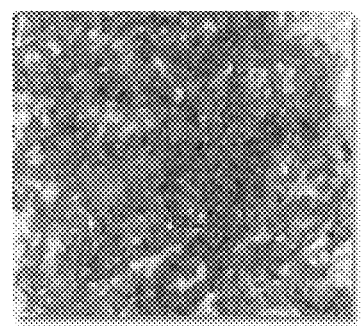
X 100
Figures 7A-7C

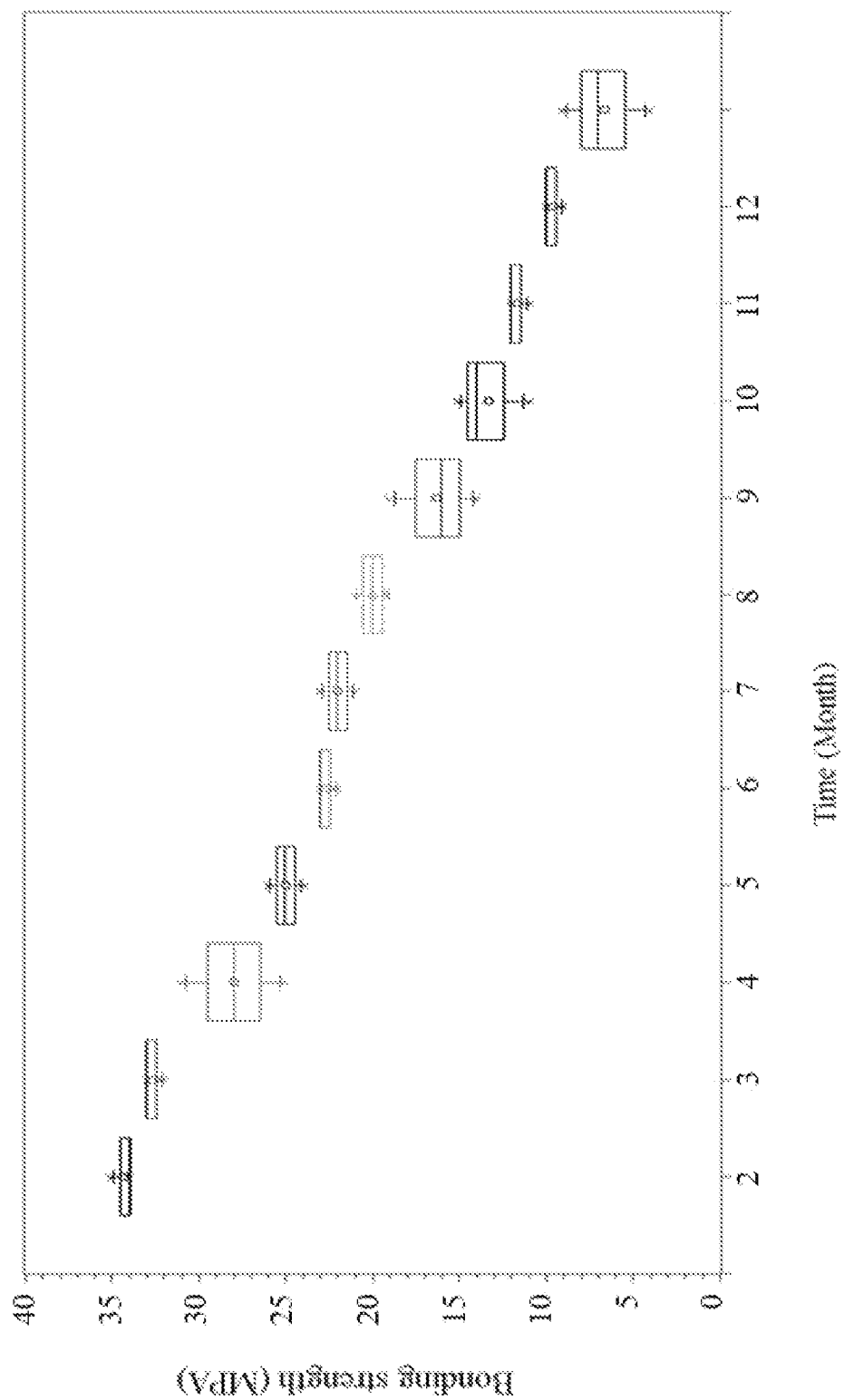

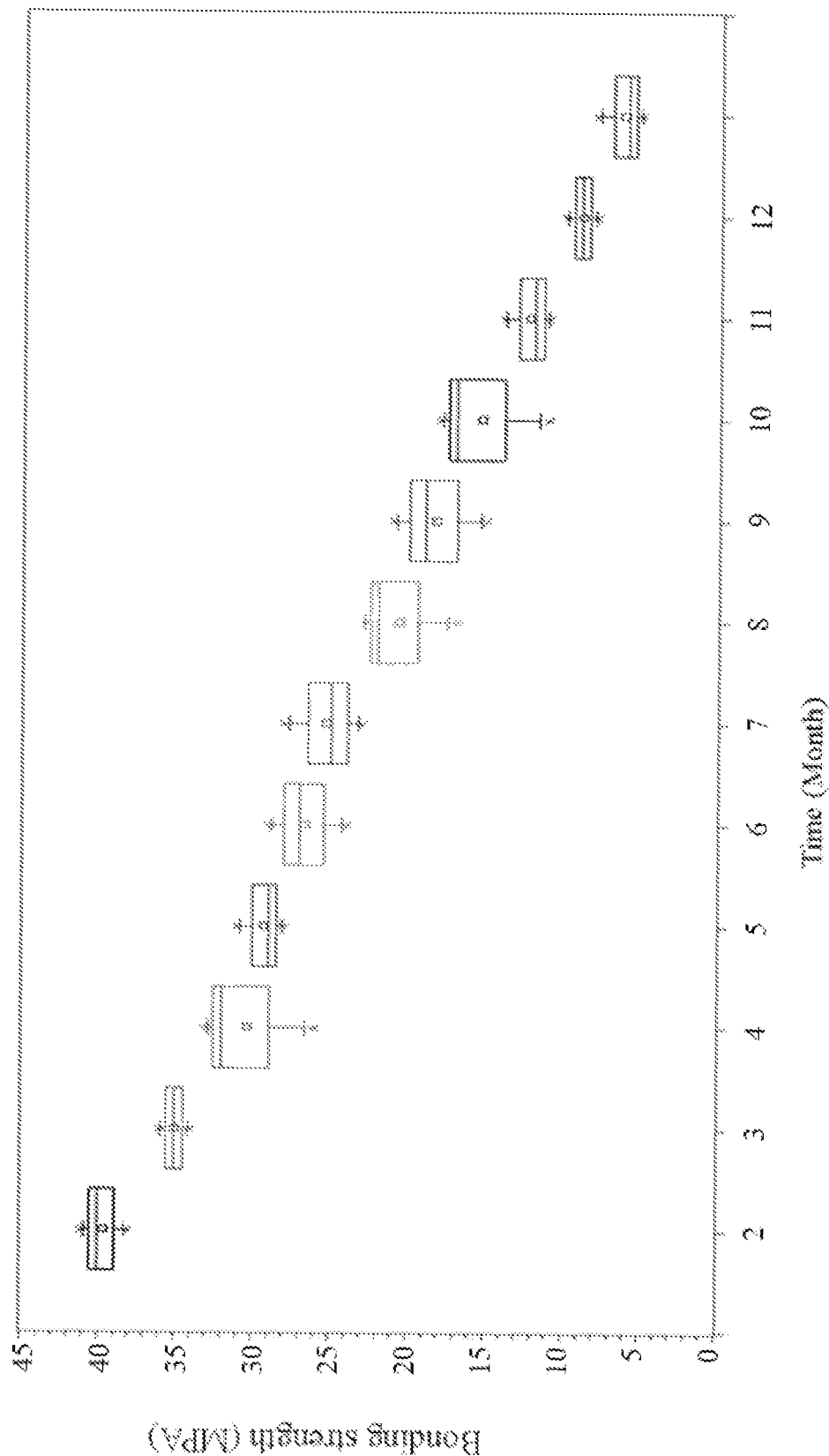

ALUMINUM SURFACE TREATMENT METHOD

BACKGROUND

The present invention relates to an aluminum surface treatment method, and more particularly to an aluminum surface treatment method for adhesively bonding a polymer-aluminum joint structure, wherein the bonding between the aluminum surface and the polymer is maximized through primary and secondary anodizing of the aluminum surface.

Although polymer-aluminum joint structures are widely used in automotive and electronic parts and components, low reliability in relation to the strength of the bonding between the polymer and aluminum has been suggested as a problem.

Meanwhile, aluminum anodizing is performed to increase the activity and friction of the aluminum surface and to induce strong bonding with the polymer.

PRIOR-ART DOCUMENTS

Patent Documents

Patent Document 1: Korea Patent Publication No. 2019-7940

SUMMARY

The present invention has been made to solve the issue, and an object thereof is to provide an aluminum surface treatment method for manufacturing a polymer-aluminum joint structure having excellent bond strength.

The aluminum surface treatment method of the present invention made to achieve the object is a method of treating the surface of aluminum for adhesive bonding with a polymer composite, characterized in that it includes
 (a) a primary anodizing treatment step wherein the aluminum surface is treated by anodic oxidation;
 (b) a step wherein the aluminum oxide film is removed from the aluminum that has undergone the primary anodizing treatment; and
 (c) a secondary anodizing treatment step wherein the aluminum from which the aluminum oxide film is removed following the primary anodizing treatment is treated by anodic oxidation again.

Step (a) is preferably performed in a solution containing 1 to 50% acetic acid, 0.1 to 5% phosphoric acid, and 0.1 to 1% sulfuric acid for 3 to 120 minutes at a current density of 0.1 to 10 A using a 500 ms pulse rectifier for a positive duration of 500 ms at 30 to 80° C.

Aluminum oxide film removal treatment of the step (b) is preferably performed by immersing the aluminum that has undergo the primary anodizing treatment in a 10 to 20% potassium permanganate solution, or a solution consisting of 1 to 6% sulfuric acid and 1 to 3% acetic acid for 10 to 600 seconds at 30 to 80° C.

The secondary anodizing treatment in the step (c) may be performed on the aluminum from which the aluminum oxide film was removed following the primary anodizing treatment in a solution containing 1 to 30% acetic acid, 0.1 to 1% phosphoric acid, and 0.01 to 1% sulfuric acid for 5 to 120 minutes at a current density of 0.01 to 1 A using a 500 ms pulse rectifier for a positive duration of 500 ms at 60 to 90° C.

The secondary anodizing treatment in the step (c) is preferably performed on the aluminum from which the aluminum oxide film was removed following the primary anodizing treatment in a solution containing 1 to 30% acetic acid, 0.1 to 1% phosphoric acid, and 0.01 to 1% sulfuric acid for 5 to 120 minutes at a current density of 0.01 to 1 A using a 500 ms pulse rectifier for a positive duration of 500 ms at 60 to 90° C. after adding additives that enhance the bond strength to the solution.

The additives are preferably 0.1 to 0.9% glycerin, 0.1 to 1% sodium lignosulfonate, 0.1 to 1% of 1,2-Bis(triethoxysilyl)ethane (BTSE), and 0.1 to 1% Y-Aminopropyltriethoxysilane (Y-APS).

The thickness of the aluminum oxide film formed on the aluminum in the step (a) may be 500 to 2,000 nm, and the thickness of the aluminum oxide film formed on the secondary anodizing treated aluminum in the step (c) may be 100 to 200 nm.

Secondary anodizing has the effects of forming a bore with a width of about 10 mm inside each of the bores formed in the film during the first anodizing of the aluminum surface, forming an oxide film in a shape similar to that of the hair of lizard feet, maximizing the contact area, and maximizing the strength of the bonding between the polymer and aluminum.

BRIEF DESCRIPTION OF THE DRAWINGS

FIGS. 7A-7C show photographs of the structural and elemental composition of the fracture surface following a T-bend test performed in each step following the primary and secondary anodizing treatment with and without additive treatment and fabrication of a polymer-aluminum joint structure, with (A) showing a joint structure that has undergone primary anodizing treatment, (B) showing a joint structure that has undergone secondary anodizing treatment, and (C) showing a joint structure that has undergone secondary anodizing treatment with additives.

FIGS. 8A-8C show graphs illustrating the changes in the bond strength of the aluminum surface over time in each step, with (A) showing the changes in the bond strength of a specimen that has undergone primary anodizing treatment, (B) showing the changes in the bond strength of a specimen that has undergone secondary anodizing treatment, and (C) showing the changes in the bond strength of a specimen that has undergone secondary anodizing treatment with additives.

DETAILED DESCRIPTION

Figures 1A, 1B, 1C:
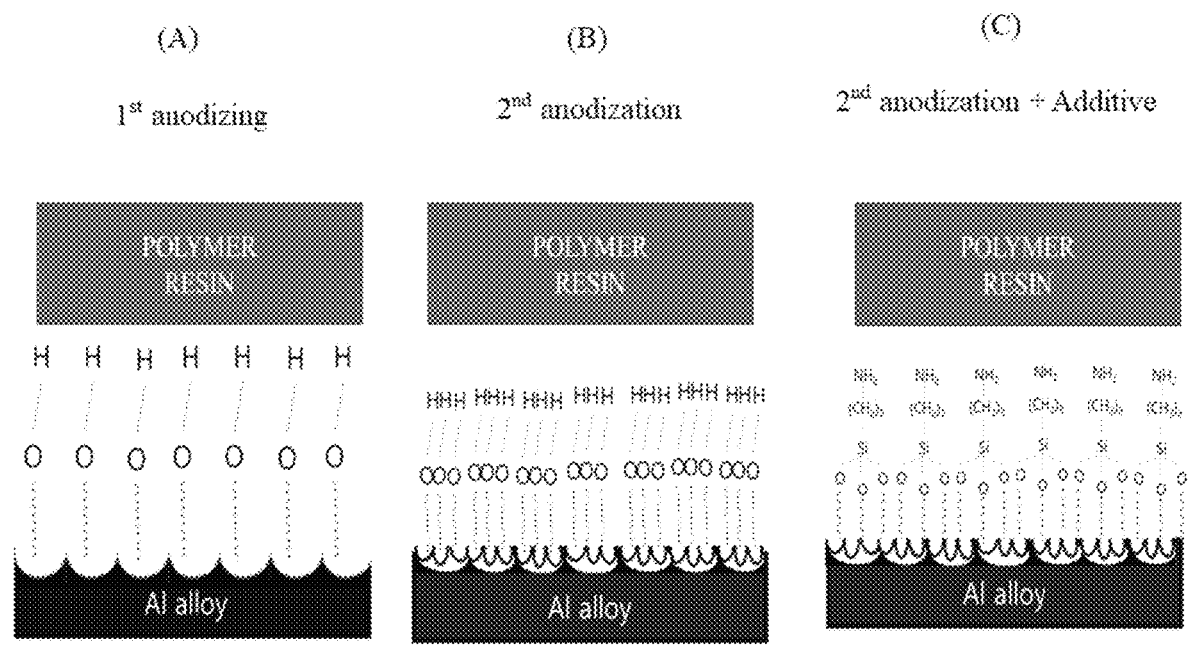
FIGS. 1A-1C show structural diagrams of the bonding reaction in each process of the polymer aluminum joint structure according to the present invention, with (A) showing the aluminum surface that has undergone primary anodizing, (B) showing the aluminum surface that has undergone secondary anodizing, and (C) showing the aluminum surface that has undergone secondary anodizing with additives.

The method of manufacturing a polymer-aluminum joint structure according to the present invention will be described based on the drawings attached hereunder.

The present invention is an aluminum surface treatment method for adhesive bonding with a polymer composite and includes (a) a primary anodizing treatment step wherein the aluminum surface is treated by anodic oxidation; (b) a step wherein the aluminum oxide film is removed from the aluminum that has undergone the primary anodizing treatment; and (c) a secondary anodizing treatment step wherein the aluminum from which the aluminum oxide film is removed following the primary anodizing treatment is treated by anodic oxidation again.

The step (a) is the primary anodizing treatment step wherein the aluminum surface is treated by anodic oxidation, and the step (a) is performed in a solution containing 1 to 50% acetic acid, 0.1 to 5% phosphoric acid, and 0.1 to 1% sulfuric acid for 3 to 120 minutes at a current density of 0.1 to 10 A using a 500 ms pulse rectifier for a positive duration of 500 ms at 30 to 80° C. The anodizing treatment is a processing method of performing electro-oxidation on the surface of aluminum and forming an oxide film on the surface, wherein the oxide film formed is porous.

The aluminum oxide film formed on the primary anodizing treated aluminum in the step (a) is 500 to 2,000 nm in thickness and has numerous bores (pores) on the surface.

The step (b) is the step of removing the aluminum oxide film on the primary anodizing treated aluminum, and in the step (b), the object of the treatment for removing the aluminum oxide film is to remove some of the bores for additional bores to be created in the remaining bores at the time of secondary anodizing treatment by partially removing the aluminum oxide film on the primary anodizing treated aluminum and leaving the bores partially by immersing the aluminum oxide film on the primary anodizing treated aluminum in a 10 to 20% potassium permanganate solution, or a solution consisting of 1 to 6% sulfuric acid and 1 to 3% acetic acid for 10 to 600 seconds at 30 to 80° C.

As for the step (c), the step of performing secondary anodizing treatment, wherein the aluminum wherein the aluminum from which the aluminum oxide film is removed following the primary anodizing treatment is treated by anodic oxidation again, is performed on the aluminum from which the aluminum oxide film was removed following the primary anodizing treatment in the step (b) in a solution containing 1 to 30% acetic acid, 0.1 to 1% phosphoric acid, and 0.01 to 1% sulfuric acid for 5 to 120 minutes at a current density of 0.01 to 1 A using a 500 ms pulse rectifier for a positive duration (application time) of 500 ms at 60 to 90° C.

The thickness of the aluminum oxide firm formed on the secondary anodizing treated aluminum in the step (c) is 100 to 200 nm.

Through primary and secondary anodizing treatments, a bore with a width of about 10 mm inside each of the bores formed in the film during the first anodizing of the aluminum surface is formed by secondary anodizing, an oxide film in a shape similar to that of the hair of lizard feet is formed and the contact area is maximized to maximized the strength of the bonding between the polymer and aluminum.

When performing secondary anodizing in the step (c), the bonding between the aluminum and polymer can be improved after secondary anodizing by adding additives to a solution containing 1 to 30% acetic acid, 0.1 to 1% phosphoric acid, and 0.01 to 1% sulfuric acid for improved binding with the polymer.

This is because the van der Waals forces occurring between the polymer and the additives remaining in the aluminum oxide film on the secondary anodizing treated aluminum generates an additional bond strength.

The additives are preferably 0.1 to 0.9% glycerin, 0.1 to 1% sodium lignosulfonate, 0.1 to 1% of 1,2-Bis(triethoxysilyl)ethane (BTSE), and 0.1 to 1% Y-Aminopropyltriethoxysilane (Y-APS).

FIG. 1 shows structural diagrams of the bonding reaction in each process of the polymer aluminum joint structure according to the present invention, with (A) showing the aluminum surface that has undergone primary anodizing, (B) showing the aluminum surface that has undergone secondary anodizing, and (C) showing the aluminum surface that has undergone secondary anodizing with additives. Multiple bores are formed in the aluminum oxide film after only the primary anodizing treatment, and this increases the bond strength between the aluminum and the polymer to improve bonding.

In relation thereto, some of the multiple bores formed during primary anodizing are removed from the aluminum oxide film after secondary anodizing of the present invention, after which additional bores are created inside the bores, and thus finer bores can be created compared to the primary anodizing treatment. This further enhances the bond strength between the aluminum and the polymer compared to the primary anodizing treatment, thus improving bonding.

In addition, by adding additives when performing secondary anodizing of the present invention, the bond strength between the aluminum and the polymer is further enhanced compared to the primary anodizing treatment as van der Waals forces get generated by the additives remaining in the bores, thereby maximizing bonding.

A specimen was fabricated by a conventional method of performing only primary anodizing performed in a solution containing 1 to 50% acetic acid, 0.1 to 5% phosphoric acid, and 0.1 to 1% sulfuric acid for 3 to 120 minutes at a current density of 0.1 to 10 A using a 500 ms pulse rectifier for a positive duration of 500 ms at 30 to 80° C., as in the step (a).

After primary anodizing in the step (a), a joint structure was fabricated by performing secondary anodizing treatment in the step (c) on the aluminum from which the aluminum oxide film was removed following the primary anodizing treatment in the step (b) in a solution containing 1 to 30% acetic acid, 0.1 to 1% phosphoric acid, and 0.01 to 1% sulfuric acid for 5 to 120 minutes at a current density of 0.01 to 1 A using a 500 ms pulse rectifier for a positive duration of 500 ms at 60 to 90° C.

After primary anodizing in the step (a), a specimen was fabricated by performing secondary anodizing treatment in the step (c) on the aluminum from which the aluminum oxide film was removed following the primary anodizing treatment in the step (b) in a solution containing 1 to 30% acetic acid, 0.1 to 1% phosphoric acid, and 0.01 to 1% sulfuric acid, to which preferably 0.1 to 0.9% glycerin, 0.1 to 1% sodium lignosulfonate, 0.1 to 1% of 1,2-Bis(triethoxysilyl)ethane (BTSE), and 0.1 to 1% Y-Aminopropyltriethoxysilane (Y-APS) were added as additives, for 5 to 120 minutes at a current density of 0.01 to 1 A using a 500 ms pulse rectifier for a positive duration of 500 ms at 60 to 90° C.

Figures 2A, 2B:
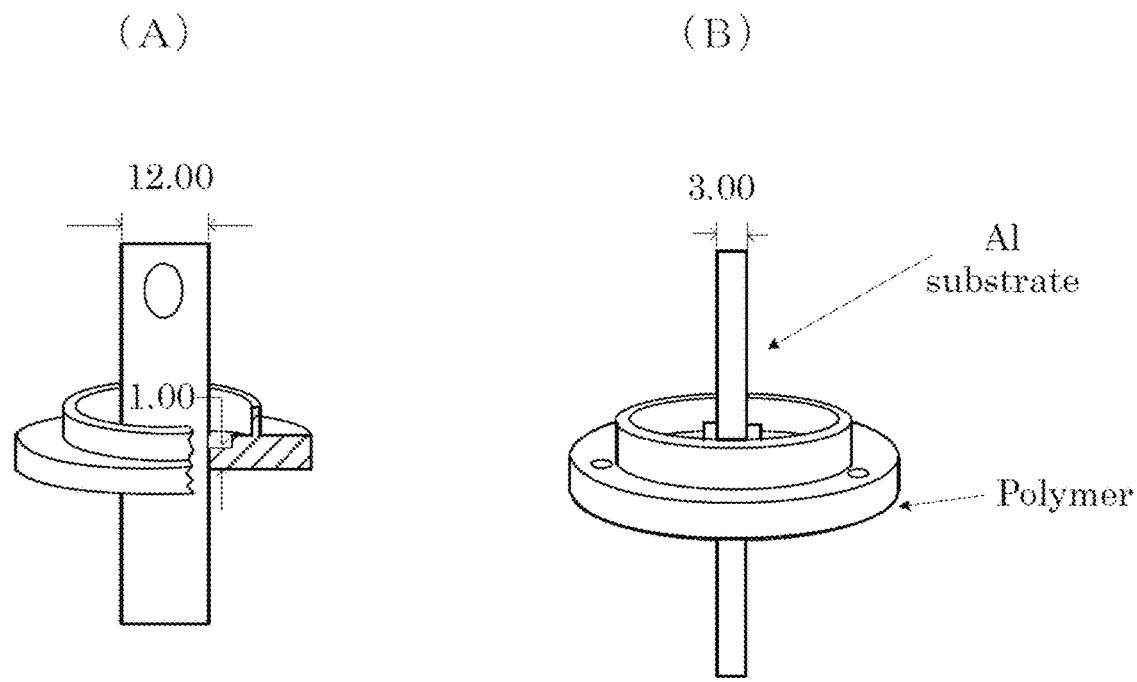
FIGS. 2A-2B illustrate the shape and size of a specimen, with (A) providing a front view, and (B) providing a side view.

FIG. 2 illustrates the shape and size of a specimen, with (A) providing a front view, and (B) providing a side view. It illustrates the shape and size of a specimen used in embodiments 1 to 3 that is comprised of an aluminum and polymer joint structure.

[Test 1]

A thermal shock test was performed to measure the bond strength using the specimens from embodiments 1 to 3, and the results are shown in Table 1 below.*

TABLE 1

| thermal shock test | $1^{st}$ anodizing | | $2^{nd}$ anodization | | $2^{nd}$ anodization + Additive | |
|---|---|---|---|---|---|---|
| | Before test (Mpa) | After test (Mpa) | Before test (Mpa) | After test (Mpa) | Before test (Mpa) | After test (Mpa) |
| 80° C./ 30 Mins & −40° C./ 30 Mins 1000 cycle | PASS PASS PASS PASS PASS | NG NG NG NG NG | PASS PASS PASS PASS PASS | NG NG PASS PASS PASS | PASS PASS PASS PASS PASS | PASS PASS PASS PASS PASS |

As shown in Table 1, it was found that there were more specimens that passed the thermal shock test among the specimens that underwent secondary anodizing treatment than the specimens that underwent only the primary anodizing treatment. Also, it was found that the specimens to which the additives were added during the secondary anodizing treatment had the best results in the thermal shock test.

[Test 2]

A constant temperature and humidity test was performed using the specimens from embodiments 1 to 3 to measure the bond strength thereof. The results are shown in Table 1 below.

TABLE 2

| constant temperature and humidity test | $1^{st}$ anodizing | | $2^{nd}$ anodization | | $2^{nd}$ anodization + Additive | |
|---|---|---|---|---|---|---|
| | Before test (Mpa) | After test (Mpa) | Before test (Mpa) | After test (Mpa) | Before test (Mpa) | After test (Mpa) |
| 1000 Hr 80° C./ 95%/ 1000 H | PASS PASS PASS PASS PASS | NG NG NG NG NG | PASS PASS PASS PASS PASS | NG NG NG NG NG | PASS PASS PASS PASS PASS | PASS PASS PASS PASS PASS |

As shown in Table 2, when comparing the specimens that underwent only the primary anodizing treatment and the specimens that have also undergone the secondary anodizing treatment, only the specimens to which the additives were added during the second anodizing treatment passed the bond strength test after the constant temperature and humidity test and had the best results.

Figures 3A, 3B:
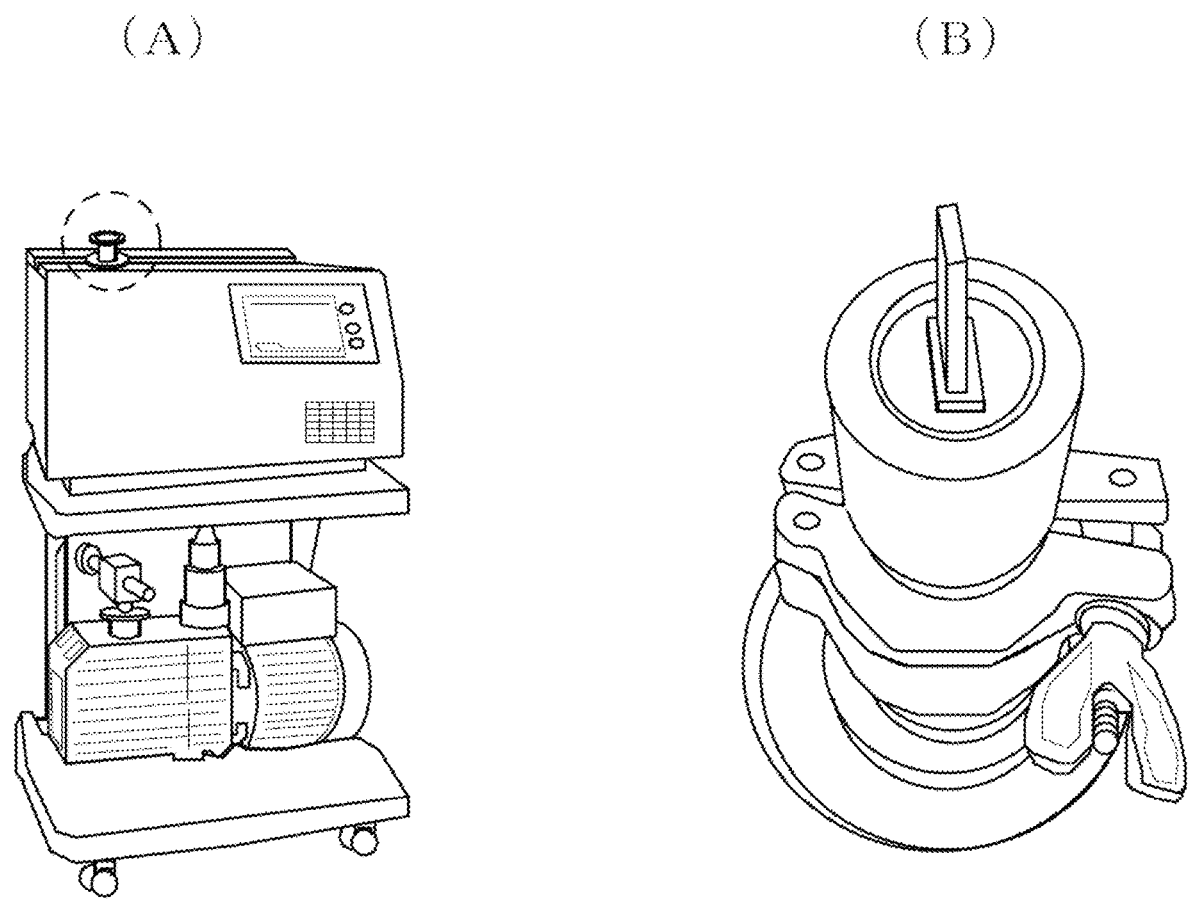
FIGS. 3A-3B show a constant temperature and humidity testing machine in (A) and a specimen in (B).

FIG. 3 shows a constant temperature and humidity testing machine in (A) and a specimen in (B). The constant temperature and humidity testing machine and specimen were used in Test 1 and 2.

Figures 4A, 4B, 4C:
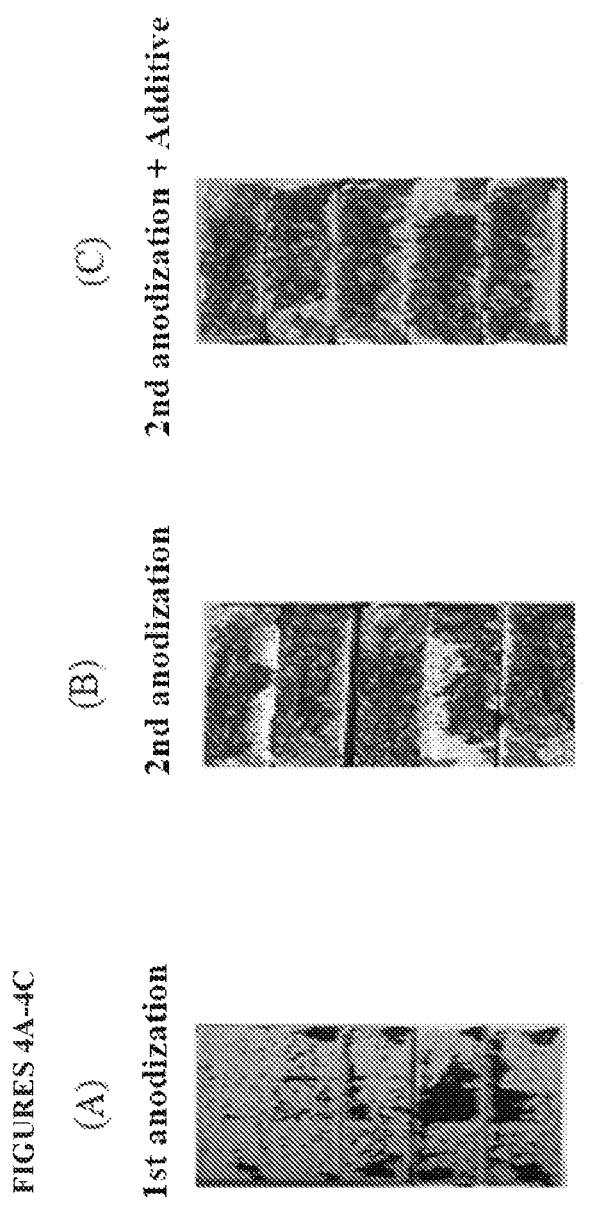
FIGS. 4A-4C show photographs of the fracture surfaces obtained from a T-tensile test following a reliability test at constant temperature and humidity for 1,000 hours in each step, with (A) showing the fracture surface of a joint structure that has undergone primary anodizing treatment, (B) showing the fracture surface of a joint structure that has undergone secondary anodizing treatment, and (C) showing the fracture surface of a joint structure that has undergone secondary anodizing treatment with additives.

FIG. 4 shows photographs of the fracture surfaces obtained from a T-tensile test following a reliability test at constant temperature and humidity for 1,000 hours in each step, with (A) showing the fracture surface of a joint structure that has undergone primary anodizing treatment, (B) showing the fracture surface of a joint structure that has undergone secondary anodizing treatment, and (C) showing the fracture surface of a joint structure that has undergone secondary anodizing treatment with additives. Comparing the photographs of the fracture surfaces, it was observed that more polymer components remained in the aluminum section of the specimens that underwent primary and secondary anodizing treatments than that of the specimens that underwent only primary anodizing treatment. Also, specimens wherein additives were added during the secondary anodizing treatment were found to have the largest amount of polymer remaining in the aluminum section, which shows that they had the best bonding force.

[Test 3]

In order to measure the changes in the bond strength using the specimens from embodiments 1 to 3, a T-tensile test was performed after storing the specimens for at constant temperature and humidity for 1,000 hours, and the composition of the fracture surface was analyzed. The results are shown in Table 3 below.

TABLE 3

| | | Al | O | C | Si |
|---|---|---|---|---|---|
| Tensile TEST AL | $1^{st}$ Anodization | 81.1 | 0.95 | 17.5 | 0.45 |
| | $2^{nd}$ Anodization | 71.3 | 3.8 | 22.4 | 2.5 |
| | $2^{nd}$ Anodization + Additive | 2.4 | 31.8 | 57.1 | 8.7 |

Figures 5A, 5B, 5C, 5D, 5E, 5F, 5G, 5H:
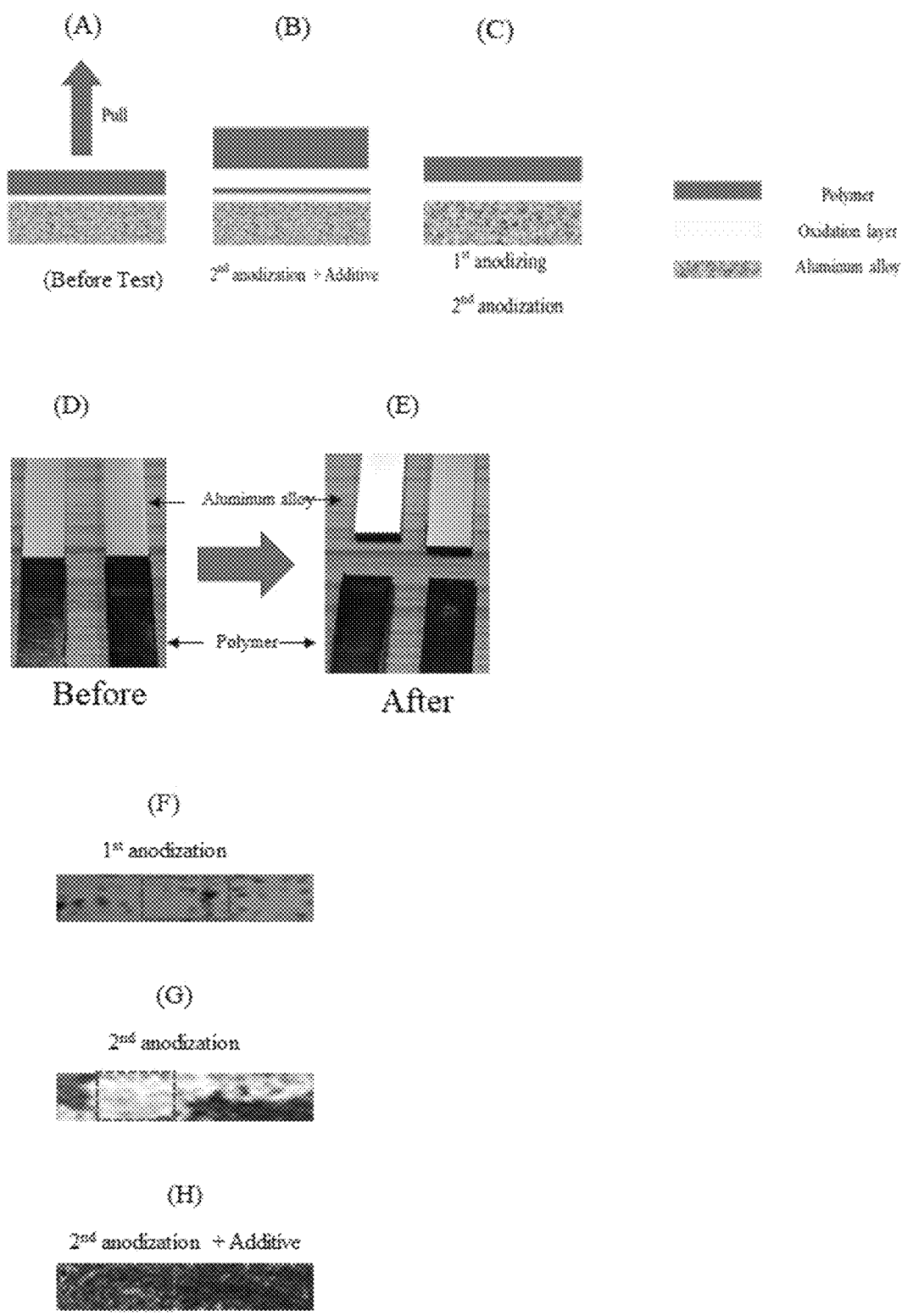
FIGS. 5A-5H show photographs of the T-tensile test and fracture surfaces, with (A) showing a side view prior to the T-tensile test, (B) showing a side view after a fracture of a joint structure that has undergone secondary anodizing treatment with additives, (C) showing a side view after a fracture of a joint structure that has undergone primary or secondary anodizing treatment, (D) showing a planar view prior to the T-tensile test, (E) showing a planar view after the T-tensile test, (F) showing the fracture surface of a joint structure that has undergone primary anodizing treatment, (G) showing the fracture surface of a joint structure that has undergone secondary anodizing treatment, and (H) showing the fracture surface of a joint structure that has undergone secondary anodizing treatment with additives.

FIG. 5 shows photographs of the T-tensile test and fracture surfaces, with (A) showing a side view prior to the T-tensile test, (B) showing a side view after a fracture of a joint structure that has undergone secondary anodizing treatment with additives, (C) showing a side view after a fracture of a joint structure that has undergone primary or secondary anodizing treatment, (D) showing a planar view prior to the T-tensile test, (E) showing a planar view after the T-tensile test, (F) showing the fracture surface of a joint structure that has undergone primary anodizing treatment, (G) showing the fracture surface of a joint structure that has undergone secondary anodizing treatment, and (H) showing the fracture surface of a joint structure that has undergone secondary anodizing treatment with additives.

The results of the T-tensile test performed after the constant temperature and humidity test following primary anodizing treatment and secondary anodizing treatment with and without additives showed that there were more polymer components remaining in the aluminum section of the specimens that underwent primary and secondary anodizing treatments than that of the specimens that underwent only primary anodizing treatment and that the largest amount of polymer components remained in the aluminum section of the specimens that underwent secondary anodizing treatment with additives.

As shown in the results in Table 3 and FIG. 5, a larger amount of C and Si (polymer components) remained after the T-tensile test in the aluminum section of the specimens that underwent primary and secondary anodizing treatments than that of the specimens that underwent only primary anodizing treatment and the largest amount of C and Si (polymer components) remained in the aluminum section of the specimens that underwent secondary anodizing treatment with additives. It was also found that the bond strength was greatest for the specimens that underwent secondary anodizing treatment with additives.

[Test 4]

In order to measure the bond strength using the specimens from embodiments 1 to 3, a T-tensile test was performed after storing the specimens for at constant temperature and humidity for 1,000 hours, and the composition of the fracture surface was analyzed. The results are shown in Table 3 below.

TABLE 4

| Element | AL | O | C | SI |
| --- | --- | --- | --- | --- |
| $1^{st}$ anodizing | 78.5 | 1.8 | 19.1 | 0.6 |
| $2^{nd}$ anodization | 64.2 | 5.6 | 28.1 | 2.1 |
| $2^{nd}$ anodization + Additive | 2.8 | 27.9 | 58.5 | 10.8 |

Figures 6A, 6B, 6C:
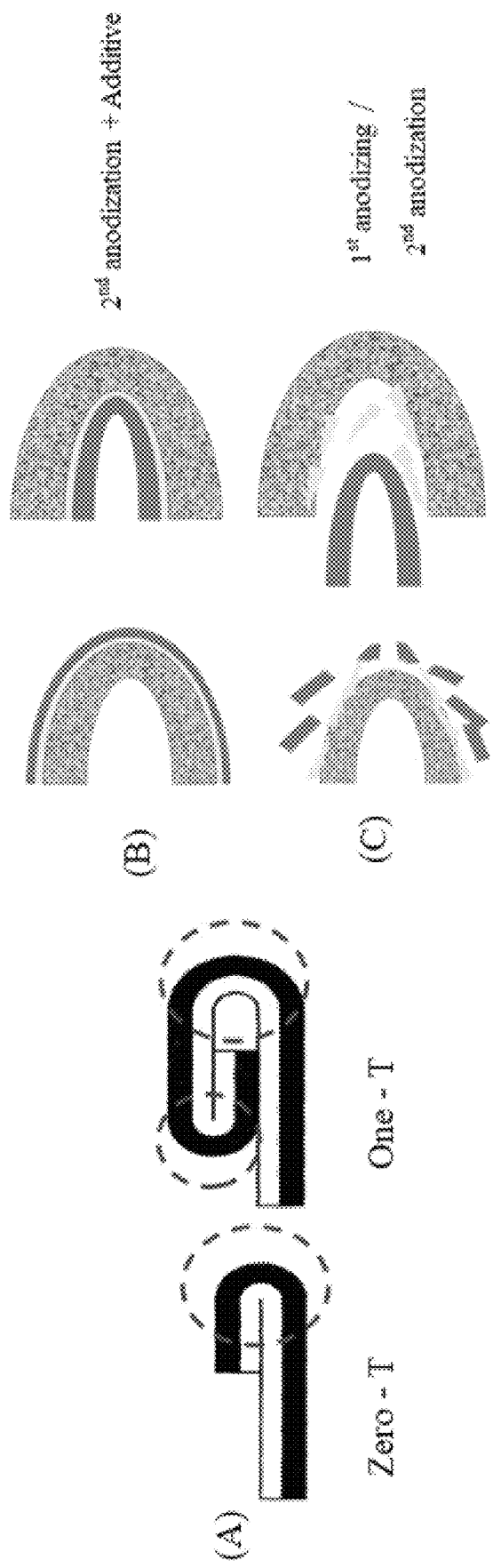
FIGS. 6A-6D show schematic diagrams and photographs of the method and results of the T-bend test conducted after performing primary and secondary anodizing treatment with and without additive treatment and fabricating a polymer-aluminum joint structure, followed by a constant temperature and humidity test in each step. (A) is a schematic diagram illustrating the method of bending once (Zero-T) or twice (One-T), (B) is a cross-sectional diagram of a joint structure that has undergone secondary anodizing treatment and additive treatment, (C) is a cross-sectional diagram of a joint structure that has undergone primary anodizing treatment or secondary anodizing treatment, and (D) illustrates the process of fabricating a joint structure for the T-bend test.
Figure 6D:
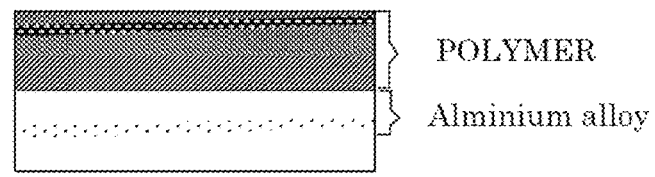
Figure 6D:
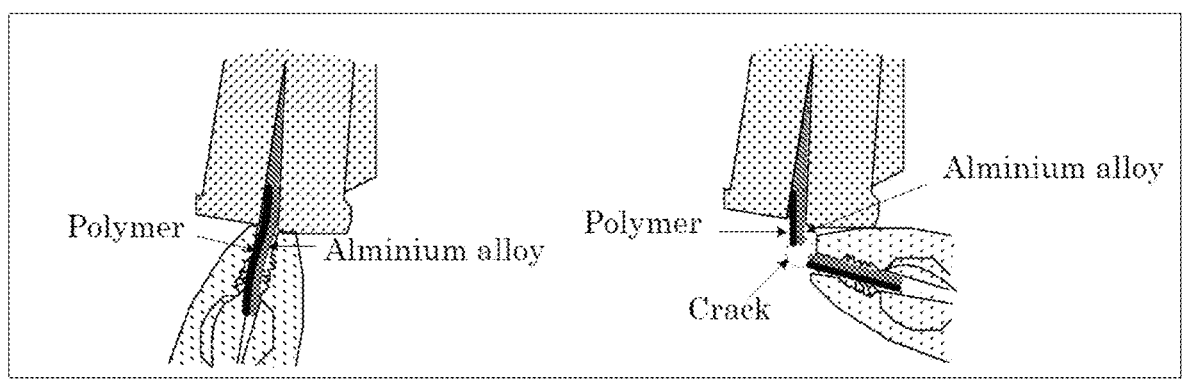

FIG. 6 shows schematic diagrams and photographs of the method and results of the T-bend test conducted after performing primary and secondary anodizing treatment with and without additive treatment and fabricating a polymer-aluminum joint structure, followed by a constant temperature and humidity test in each step. (A) is a schematic diagram illustrating the method of bending once (Zero-T) or twice (One-T), (B) is a cross-sectional diagram of a joint structure that has undergone secondary anodizing treatment and additive treatment, (C) is a cross-sectional diagram of a joint structure that has undergone primary anodizing treatment or secondary anodizing treatment, and (D) illustrates the process of fabricating a joint structure for the T-bend test.

FIG. 7 shows photographs of the structural and elemental composition of the fracture surface following a T-bend test performed in each step following the primary and secondary anodizing treatment with and without additive treatment and fabrication of a polymer-aluminum joint structure, with (A) showing a joint structure that has undergone primary anodizing treatment, (B) showing a joint structure that has undergone secondary anodizing treatment, and (C) showing a joint structure that has undergone secondary anodizing treatment with additives.

It was found that a larger amount of polymer components remained in the aluminum section of the specimens that underwent primary and secondary anodizing treatments than that of the specimens that underwent only primary anodizing treatment and the largest amount of polymer components remained in the aluminum section of the specimens that underwent secondary anodizing treatment with additives.

From the results shown in Table 4 and the photographs in FIG. 7, it was found that a larger amount of C and Si (polymer components) remained at the time of the T-tensile test in the aluminum section of the specimens that underwent primary and secondary anodizing treatments than that of the specimens that underwent only primary anodizing treatment and the largest amount of C and Si (polymer components) remained in the aluminum section of the specimens that underwent secondary anodizing treatment with additives. It was also found that the bond strength was greatest for the specimens that underwent secondary anodizing treatment with additives.

[Test 5]

In order to prepare the specimens according to embodiments 1 to 3, after implementing embodiments 1 to 3 on aluminum specimens, they were allowed to stand at room temperature for a certain amount of time before bonding (injection) with the polymer, after which they were with the polymer and the bond strength of each joint structure was measured.

Figure 8C:
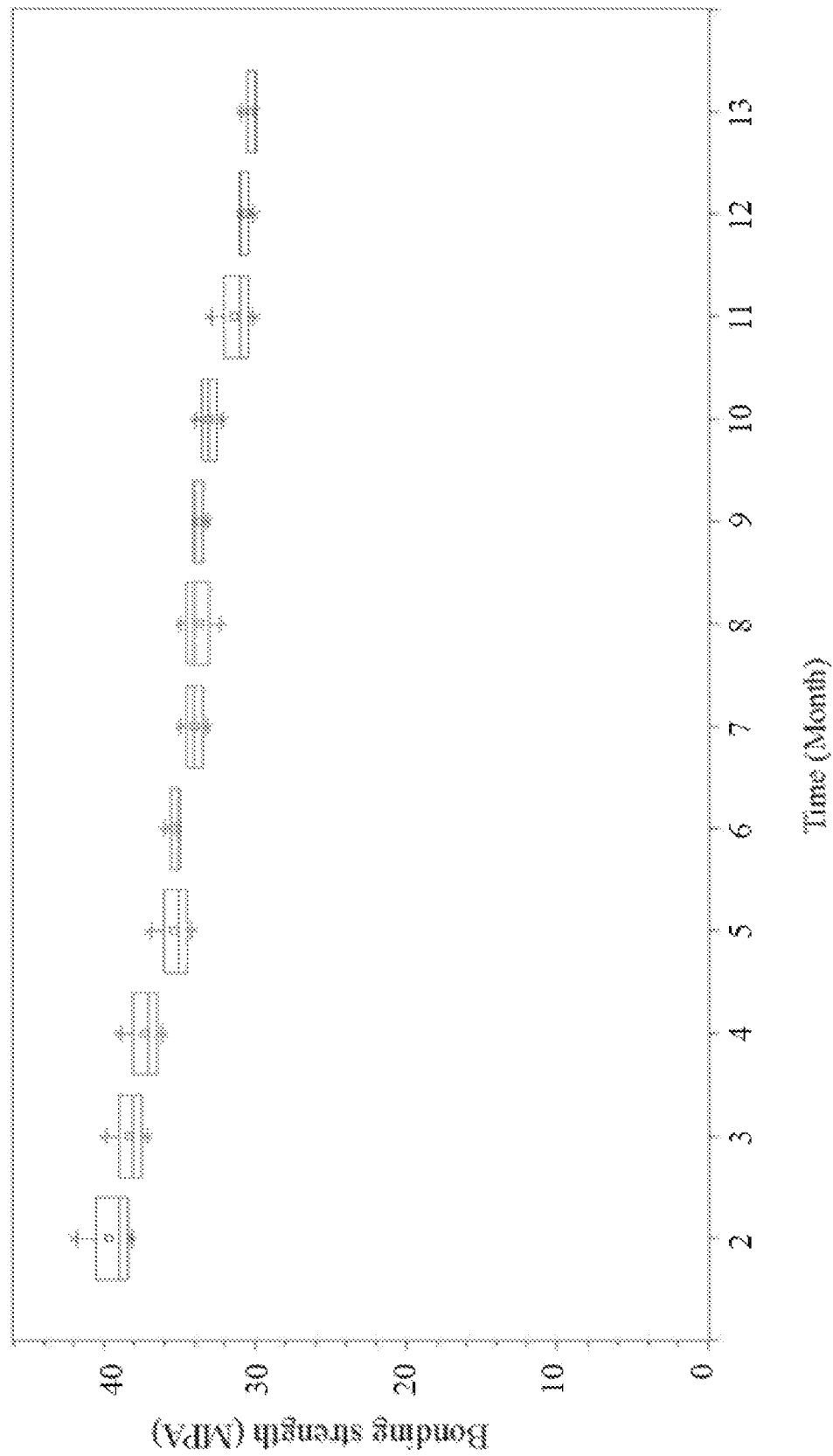

FIG. 8 shows graphs illustrating the changes in the bond strength of the aluminum surface over time in each step, with (A) showing a graph of the changes in the bond strength of a specimen over time as it underwent primary anodizing treatment, allowed to stand for a certain amount of time at room temperature before bonding (injection) with the polymer, bonded with the polymer, and allowed to stand (B) showing a graph of the changes in the bond strength of a specimen over time as it underwent secondary anodizing treatment, allowed to stand for a certain amount of time at room temperature before bonding (injection) with the polymer, bonded with the polymer, and allowed to stand, and (C) showing a graph of the changes in the bond strength of a specimen over time as it underwent secondary anodizing treatment with additives, allowed to stand for a certain amount of time at room temperature before bonding (injection) with the polymer, bonded with the polymer, and allowed to stand.

Figure 9:
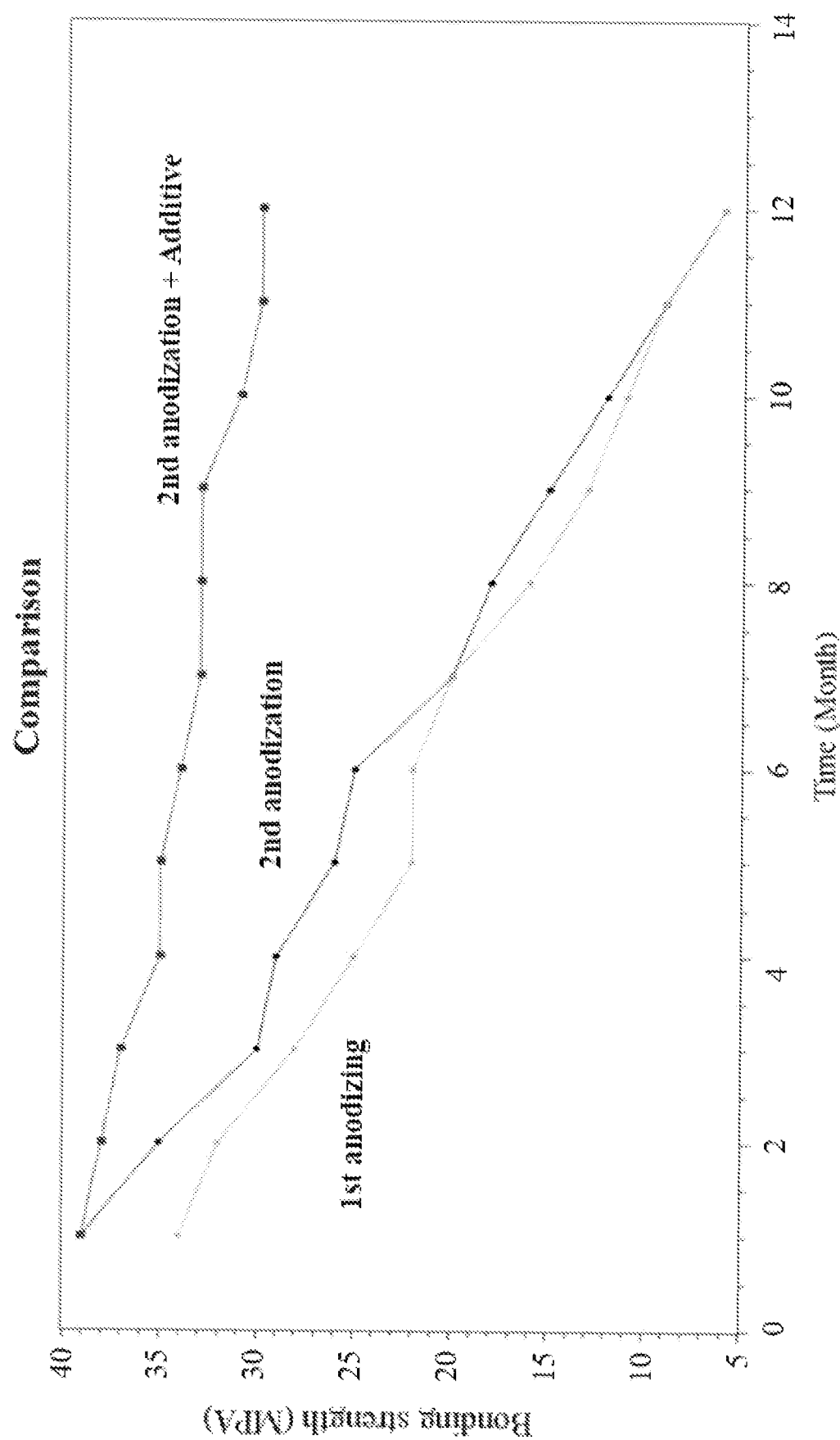
FIG. 9 show graphs presenting the results from FIG. 8 (A) to (C).

FIG. 9 shows graphs presenting the results from FIG. 8 (A) to (C) and shows the results of FIGS. 8 (A), (B), and (C) for comparison. FIG. 9 shows the changes in the bond strength over time.

As shown in the graphs of FIGS. 8 and 9, the bond strength deteriorated less over time in the specimens that underwent primary and secondary anodizing treatment than the specimens that underwent only primary anodizing treatment. The deterioration in the bond strength was even less in the specimens to which additives were added during the secondary anodizing treatment, and they were found to have the best bond strength.

Based on the test results, when fabricating aluminum presents according to the present invention, the risk of reduced bond strength as a result of allowing the aluminum to stand may be minimized.

The present invention is a method of fabricating a polymer-aluminum joint structure, and it can promote weight reduction of parts and cost reduction by enhancing the bond strength between the polymer and aluminum.

The invention claimed is:

1. An aluminum surface treatment method for bonding with a polymer composite which comprises:
   (a) a primary anodizing treatment step wherein the aluminum surface is treated by anodic oxidation;
   (b) a step wherein the aluminum oxide film is removed from the aluminum that has undergone the primary anodizing treatment; and
   (c) a secondary anodizing treatment step wherein the aluminum from which the aluminum oxide film is removed following the primary anodizing treatment is treated by anodic oxidation again,
   of which the step (a) is performed in a solution containing 1 to 50 wt. % acetic acid, 0.1 to 5 wt. % phosphoric acid, and 0.1 to 1 wt. % sulfuric acid for 3 to 120 minutes at a current density of 0.1 to 10 A/dm$^2$ using a 500 ms pulse rectifier for a positive duration of 500 ms at 30 to 80° C.;
   the removal of the aluminum oxide film in the step (b) is performed by immersing the aluminum that underwent the primary anodizing treatment in a 10 to 20 wt. % potassium permanganate solution, or a solution consisting of a solvent, 1 to 6 wt. % sulfuric acid and 1 to 3 wt. % acetic acid for 10 to 600 seconds at 30 to 80° C.;
   and the secondary anodizing treatment in the step (c) is performed on the aluminum from which the aluminum oxide film was removed after the primary anodizing treatment in a solution containing 1 to 30 wt. % acetic acid, 0.1 to 1 wt. % phosphoric acid, and 0.01 to 1 wt. % sulfuric acid, to which additives that improve binding with the polymer are added, for 5 to 120 minutes at a current density of 0.01 to 1 A/dm$^2$ using a 500 ms pulse rectifier for a positive duration (application time) of 500 ms at 60 to 90° C.; and
   wherein the additives are 0.1 to 0.9 wt. % glycerin, 0.1 to 1 wt. % sodium lignosulfonate, 0.1 to 1 wt. % of 1,2-Bis(triethoxysilyl)ethane (BTSE), and 0.1 to 1 wt. % Y-Aminopropyltriethoxysilane (Y-APS).

2. The aluminum surface treatment method according to claim 1 comprising:
   the step (a) forms numerous bores (pores) on the surface by the anodizing,
   the step (b) removes some of the aluminum oxide film and leave behind some of the multiple bores, and
   the step (c) forms additional bores in the multiple bores by the secondary anodizing.

3. The aluminum surface treatment method according to claim 1 comprising thickness of the aluminum oxide film formed on the aluminum in the step (a) is 500 to 2,000 nm, and the thickness of the aluminum oxide film formed on the secondary anodizing treated aluminum in the step (c) is 100 to 200 nm.

* * * * *